(12) United States Patent
Stummer et al.

(10) Patent No.: US 6,547,453 B1
(45) Date of Patent: Apr. 15, 2003

(54) SYSTEMS AND METHODS FOR DETECTING FAULT CONDITIONS AND DETECTING AND PREVENTING POTENTIALLY DANGEROUS CONDITIONS IN AN OPTICAL SYSTEM

(75) Inventors: Alan D. Stummer, Thornhill (CA); Lars Friedrich, Glen Burnie, MD (US)

(73) Assignee: Ciena Corporation, Linthicum, MD (US)

( * ) Notice: Subject to any disclaimer, the term of this patent is extended or adjusted under 35 U.S.C. 154(b) by 106 days.

(21) Appl. No.: 09/651,501

(22) Filed: Aug. 30, 2000

Related U.S. Application Data

(63) Continuation-in-part of application No. 09/481,826, filed on Jan. 12, 2000, now Pat. No. 6,305,851, and a division of application No. 09/481,826, filed on Jan. 12, 2000, now Pat. No. 6,305,851.

(51) Int. Cl.[7] .................................................. G02B 6/36
(52) U.S. Cl. ............................................ 385/88; 385/24
(58) Field of Search .............................. 385/24, 88, 89, 385/90, 91, 147; 359/900

(56) References Cited

U.S. PATENT DOCUMENTS

| | | | |
|---|---|---|---|
| 5,311,525 A | * | 5/1994 | Pantell et al. ................ 372/102 |
| 6,028,661 A | | 2/2000 | Minami et al. |
| 6,305,851 B1 | | 10/2001 | Stummer ..................... 385/88 |

OTHER PUBLICATIONS

Notification of Transmittal of International Preliminary Examination Report.

* cited by examiner

*Primary Examiner*—Hung N. Ngo
(74) *Attorney, Agent, or Firm*—Michael R. Cammarata

(57) ABSTRACT

A system detects potentially dangerous conditions, prevents damage to optical components, and prevents humans from being physically harmed by stray pumping light. Optical systems employing distributed amplification such as Raman amplification utilize pumps having high output powers. These high output powers create dangerously high power densities in the optical fiber. If a connection is imperfect a hot spot may develop and the connection damaged by the pumping light. Fiber damage, disconnections and component degradations or failures may also permit the pumping light to escape the intended path and cause physical harm to humans as well as equipment. Pumping light backreflections caused by such imperfect connections, degraded/failed components, and fiber damage are detected. A controller compares the backreflection amount against a threshold to determine whether a precautionary measure should be taken such as shutting down the pump, decreasing pump power to a safe level or setting a maintenance flag. Multiple thresholds may be utilized to distinguish between different conditions such as degraded and failed conditions and to exercise appropriate levels of precautionary measure(s). The detection of distributed pumping light backreflections may also be used to shut or power down other types of pumps such as an EDFA.

28 Claims, 13 Drawing Sheets

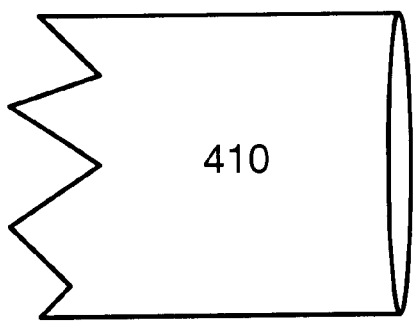 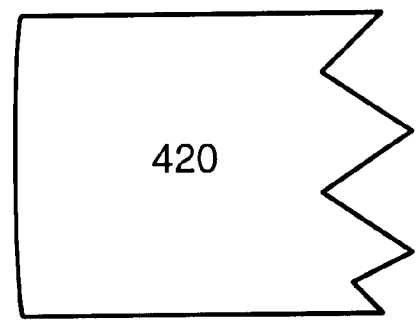
FIG. 4A
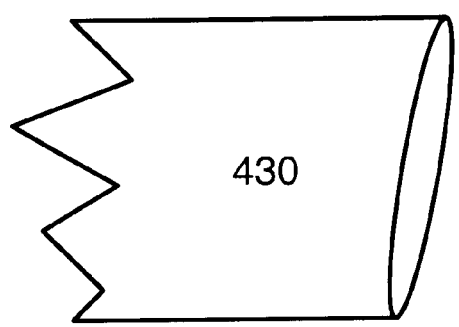 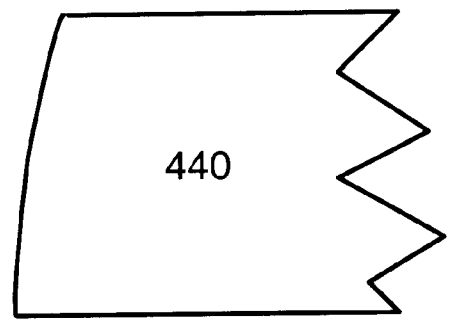
FIG. 4B

SYSTEMS AND METHODS FOR DETECTING FAULT CONDITIONS AND DETECTING AND PREVENTING POTENTIALLY DANGEROUS CONDITIONS IN AN OPTICAL SYSTEM

CROSS REFERENCE TO RELATED APPLICATIONS

This application is a CIP-Divisional of and claims the benefit of priority under 35 U.S.C. §120 to U.S. application Ser. No. 09/481,826 filed on Jan. 12, 2000 and which issued as U.S. Pat. No. 6,305,851 on Oct. 23, 2001 the entirety of which is hereby incorporated by reference.

BACKGROUND OF THE INVENTION

1. Field of the Invention

The present invention relates generally to optical fiber systems and, more particularly, to systems and methods that detect a potentially dangerous condition in an optical system and take precautionary measures to reduce or eliminate the potentially dangerous condition. The present invention also relates to systems and methods that detect signal and pump path integrity.

2. Description of Related Art

Optical communication systems have replaced other communication mediums due to their many advantages. For example, optical communication systems typically have wide bandwidth and low attenuation, are immune to electrical noise, offer relatively secure transmission of signals, and can transmit signals over long distances.

Despite the low attenuation of optical communication systems, the optical signals they transmit nevertheless require amplification. Although many types of optical amplifiers currently exist, the most widely used amplifiers are lumped or discrete amplifiers. Discrete amplifiers typically include an optical fiber doped with an optically active material, such as erbium or other rare earth elements. Generally, the core region of the optical fiber contains the dopant, which is optically excited to provide optical gain to an optical signal having a suitable wavelength. The dopant may be excited by subjecting it to an optical pump signal of a suitable pump wavelength. For example, an erbium-doped fiber amplifier amplifies optical signals of wavelengths in the range of 1520 nm to 1580 nm when pumped by an optical pump signal of wavelength 980 nm or 1480 nm.

Other types of optical amplifier that are widely used in optical systems include distributed amplifiers which amplify a signal over a distributed segment of fiber. Examples of such distributed amplifiers include those based on stimulated Raman scattering or stimulated Brillouin scattering. Such amplifiers perform distributed amplification over a relatively long segment of fiber. A typical Raman amplifier may distribute amplification over 20 km of fiber.

Both discrete and distributed amplifiers typically use optical pump lasers to generate the pump signal. The lasers generate optical pump signals of high power density in the fiber, the connectors, and various other components of the optical system. This is particularly true of distributed amplifiers such as Raman amplifiers which may use such high power densities (e.g. 5 MW/cm$^2$) that dangerous conditions exist when the pumping light escapes the optical system or when imperfect connections exist. Imperfect connections may be caused, for example, by imperfect mating of fibers or by surface contamination on the fiber ends (e.g. oils, dust, or dirt) that can absorb some of the optical pump power and cause a hot spot, which could irreparably damage the connector. Once damaged, the connector must be replaced.

Indeed, the high power density used by many optical pump lasers may exceed governmental safety standards. If the fiber or an optical component connected to the fiber is damaged in some way such as by cutting or breaking or if somebody disconnects a component downstream of the optical pump, then the pumping light may escape the optical system and thereby create a hazardous condition for humans. These hazardous conditions include not only risks of eye damage but also skin and perhaps even other bodily damage. A disconnected fiber end or a damaged fiber may also cause high power density pumping light to impinge on other optical components and cause damage.

Accordingly, there exists a need for a system which detects signal or pump path integrity of an optical system being pumped by optical amplifiers. A need also exists for a system that takes precautionary measures when the pumped optical fiber is damaged or when a connection or component in the optical system being pumped has failed or degraded.

SUMMARY OF THE INVENTION

Systems and methods consistent with the present invention address this need by monitoring back reflections of the pumping light that reflect off of imperfect connectors, damaged components, damaged fiber, etc to detect a potentially hazardous condition and take precautionary measures before significant damage can occur and before a hazardous condition exists.

In accordance with the purpose of the invention as embodied and broadly described herein, a system, in one implementation consistent with the present invention, prevents damage to at least one component of a laser apparatus including a pumping laser that emits a light signal of increasing power during power up. At least one component receives the pumping light signal from the laser, and reflects at least a portion of the pumping light signal when the component is faulty, damaged or imperfect. The system includes a detector and a monitoring circuit. The detector detects the reflected light signal; and the monitoring circuit receives the reflected light signal, determines an amount of power in the reflected light signal, calculates a ratio of the power of the light signal emitted by the laser to the power in the reflected light signal, compares the ratio to a predetermined threshold to determine whether the imperfect connection or damaged component exists, sends a notification to an operator and/or shuts down the laser when the faulty or damaged component exists.

In another implementation consistent with the present invention, a system detects an imperfect connection in a laser component. The system includes a laser, a connector, and a monitoring circuit. The laser emits a light signal; the connector transmits the light signal external to the laser component and reflects at least a portion of the light signal when an imperfect connection exists; and the monitoring circuit detects an amount of the reflected light signal and determines that the imperfect connection exists when the detected amount of the reflected light signal exceeds a predetermined amount.

In yet another implementation consistent with the present invention, an optical amplifier includes an active optical fiber and at least one laser component. The laser component provides power to the active optical fiber. The laser component includes a laser, a connector, and a monitoring circuit. The laser outputs a light signal. The connector transmits the light signal to the active optical fiber and reflects at least a portion of the light signal when an imperfect connection exists. The monitoring circuit determines whether the imperfect connection exists using the reflected light signal.

In yet another implementation consistent with the present invention, an optical amplifier such as a Raman or Brillouin amplifier includes an optical pumping source connected to a fiber optic system and pumping the optical fiber at a wavelength selected to provide gain to a signal travelling in a segment of the optical fiber. If the optical fiber is damaged or if a connection or component in the optical system is degraded or failed, then these conditions cause pumping light to be reflected. A back reflection detector detects the amount of the reflected light signal and a controller takes at least one precautionary measure when the detected amount of the reflected light signal exceeds a threshold value. The at least one precautionary measure includes shutting down or reducing output power of the optical pump source.

In still another implementation, the controller may compare the detected amount of reflected light against two or more thresholds. Exceeding the first threshold may indicate a degraded condition while exceeding the second threshold may indicate a failed condition. The controller may then use these thresholds to decide between shutting down and reducing output power of the optical pump. Exceeding the first threshold may also indicate that the condition may be continuing to degrade and maintenance is required before the second threshold is reached.

In yet another implementation, a switchable attenuator, located between the optical pump and the optical system, may be controlled to attenuate the pumping light or prevent it from entering the optical system.

Another precautionary measure that may be used by the invention is the setting a maintenance flag, raising of an alarm or otherwise notifying personnel of a problem. Such flags and alarms can notify maintenance crews of the hazardous condition so that they can protect themselves as well as begin fixing the degraded condition that caused the back reflection before damage or hazardous conditions occur.

In yet another implementation in which a plurality of optical pump sources are utilized to amplify the signal, the invention may detect a backreflection from one optical pump source and control all of the optical pump sources to reduce power or shut down.

The systems and methods of the invention may operate during power up such that detection of back reflections and the taking of precautionary measures may occur while the optical pump source emits the pumping light signal with increasing power during a power up sequence. The invention may also be continuously operable during power up and steady state operational modes.

The amount of detected back reflection may be quantified in various ways including the power or energy received by a photodetector. Any such quantifications may be compared against one or more thresholds to determine a degraded or failed condition.

The inventive methods also include detecting signal or pump path integrity in a fiber optic system including an optical fiber and an optical pump source. To detect signal or pump path integrity the inventive methods provide gain to a signal travelling in a segment of the optical fiber with the optical pump source; detect a reflected light signal, wherein the reflected light signal is a reflected pumping light signal from the optical pump source that is reflected when the optical fiber is damaged or when a connection or component in the optical system is degraded or failed; and determine that the signal path integrity is compromised when a detected amount of the reflected pumping light signal detected by said detecting step exceeds a threshold value. As above, the threshold may include a plurality of thresholds to distinguish between, for example a failed state and a degraded state Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4A and 4B are exemplary diagrams of types of connections that may be provided by the connector of FIG. 3;

DETAILED DESCRIPTION OF PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Systems and methods consistent with the present invention may detect damaged fiber, damaged paths, and imperfect connections or components in a fiber optic system to prevent damage to thereto and harm to humans. The systems and methods may monitor back reflections from the degraded connector/component or damaged fiber or path, as the pump laser gradually powers up and during steady state pump laser operation, to determine whether an imperfect component or damaged fiber or path exists. Upon detection of such a sufficiently strong pumping light backreflection, the invention may also take preventative measures preferably before the pumping light can cause damage to humans or components of the optical system.

Exemplary System (First Embodiment)

Figure 1:
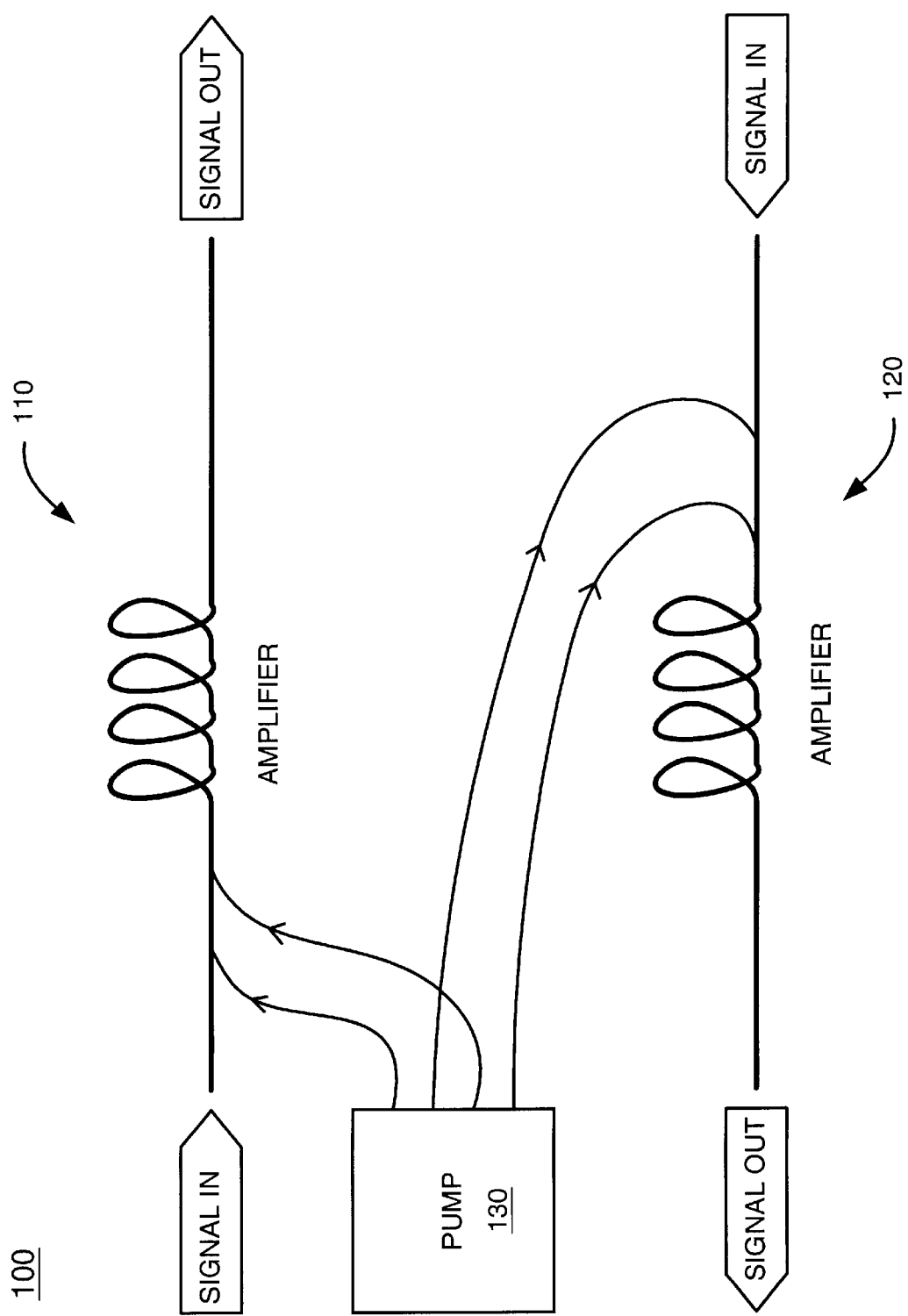
FIG. 1 is a diagram of an exemplary system in which systems and methods consistent with the present invention may be implemented.

FIG. 1 is an exemplary system 100 in which systems and methods consistent with the present invention may be implemented. The system 100 includes two amplifiers 110 and 120 and a pump 130. Each of the amplifiers 110 and 120 may be a discrete or distributed amplifier. If the amplifiers 110, 120 are discrete amplifiers, then they may include a fiber section doped with an optically active material, such as an Erbium-doped fiber amplifier that amplifies signals travelling along the fiber with a wavelength of approximately 1550 nm. The amplifier 110 amplifies signals travelling in one direction and the amplifier 120 amplifies signals travelling in the opposite direction.

Figure 2:
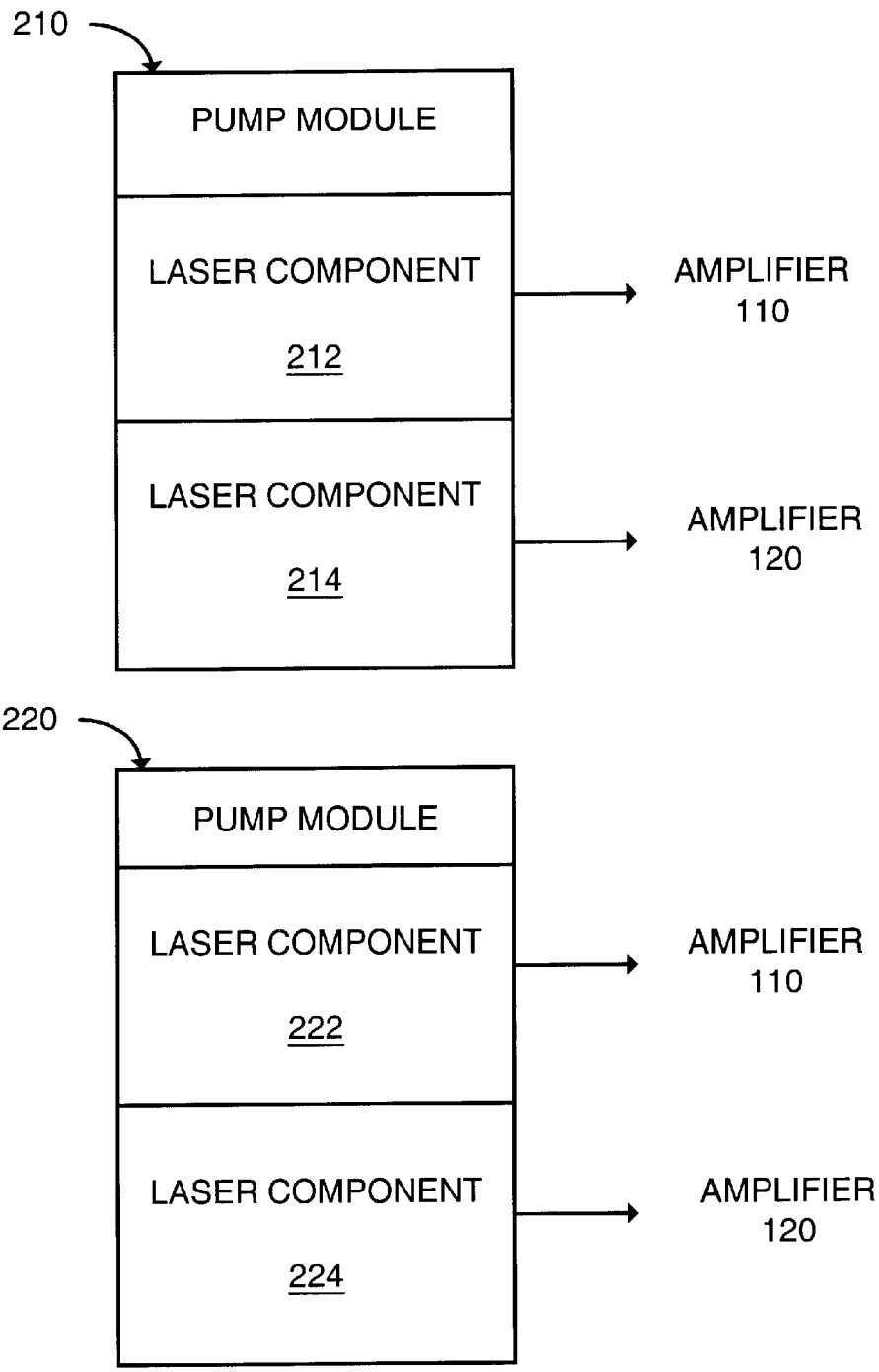
FIG. 2 is a detailed diagram of the pump of FIG. 1 in an implementation consistent with the present invention.

The pump 130 supplies power to the amplifiers 110 and 120. FIG. 2 is a detailed diagram of the pump 130 in an implementation consistent with the present invention. In this implementation, the pump 130 includes two pump modules 210 and 220. Each of the pump modules 210 and 220 typically includes two laser components 212 and 214 and 222 and 224, respectively, for redundancy. In another implementation consistent with the present invention, the pump 130 may include a different number of pump modules and the pump modules may include a different number of laser components.

Figure 3:
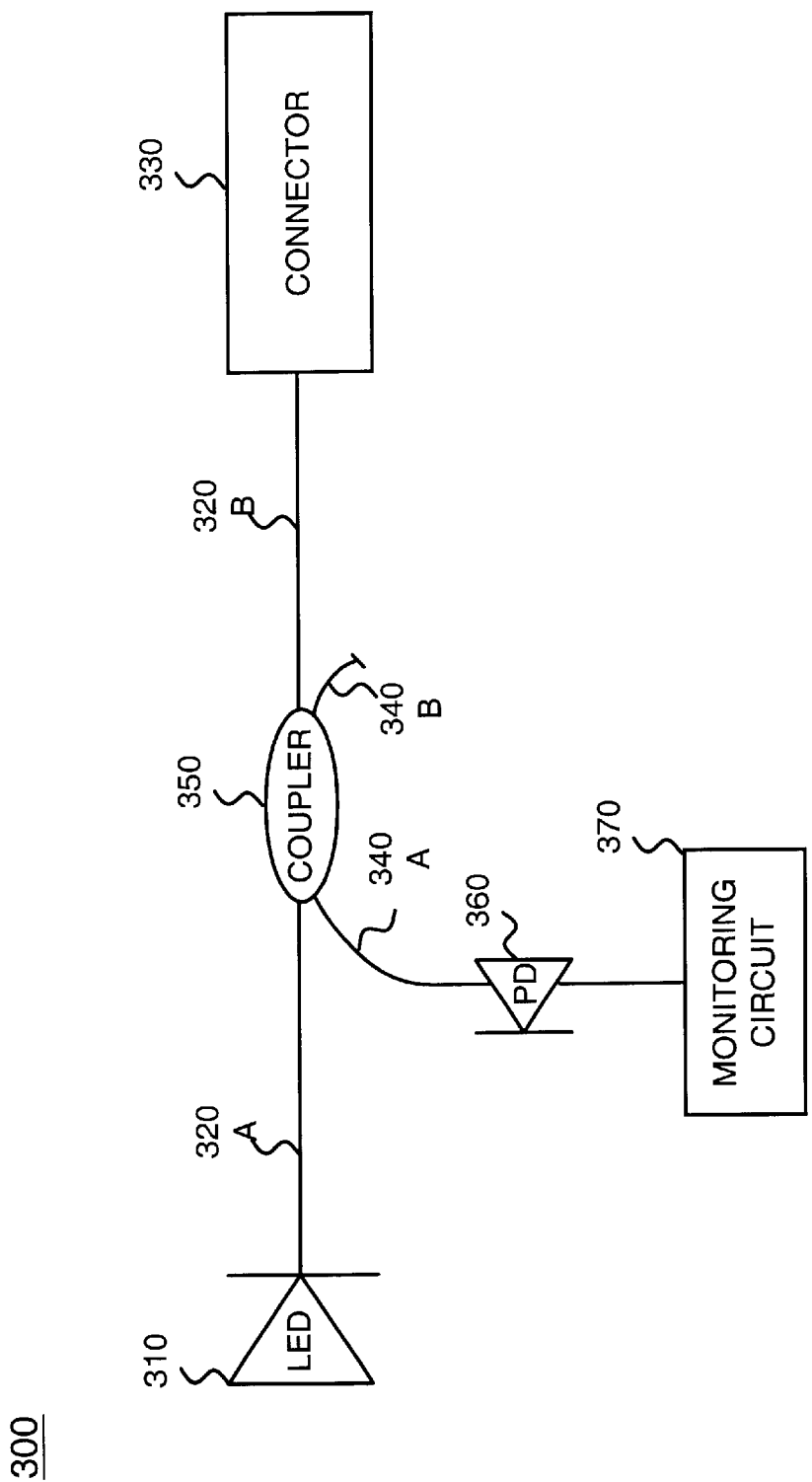
FIG. 3 is a detailed diagram of the laser component of FIG. 2 in an implementation consistent with the present invention.

FIG. 3 is a detailed diagram of a laser component 300, such as laser components 212, 214, 222, and 224, in an implementation consistent with the present invention. The laser component 300, laser 310, a pump fiber 320, a connector 330, a back reflection fiber 340, an optical transfer device, such as a circulator or coupler 350, a detector 360, and a monitoring circuit 370. The laser 310 typically includes a conventional semiconductor laser emitting light in a continuous wave (CW) mode at a wavelength of 980 or 1480 nm. Moreover, the power associated with light output from the laser 310 is typically sufficient to excite the erbium ions in the optical amplifier 110 (FIG. 1), and is often in a range of 100–500 mW. In other implementations consistent with the present invention, the laser 310 emits light of a different power and/or of a different wavelength.

The power fiber 320 (320A and 320B) includes an optical fiber that connects the laser 310 to the connector 330. The connector 330 may include a conventional connector, such as an E2000 style connector manufactured by Diamond. FIGS. 4A and 4B are exemplary diagrams of types of connections that may be provided by the connector 330. FIG. 4A illustrates a straight connection in which the fiber ends 410 and 420 have a straight cut. FIG. 4B illustrates an angled connection in which the fiber ends 430 and 440 have an angled cut, such as a seven degree cut. In general, straight-cut connections cause more reflection of incident light than angled-cut connections.

Returning to FIG. 3, the back reflection fiber 340 includes an optical fiber with one end connected to the coupler 350 and the other end connected to the detector 360 and the monitoring circuit 370. The coupler 350 may include a conventional directional coupler that splits a signal received on the power fiber 320A to both the power fiber 320B and a terminated fiber 342, and splits a reflected signal received on the power fiber 320B to both the power fiber 320A and the reflection fiber 340. The amount of split may vary.

In one implementation consistent with the present invention, the split amount is a 99 percent to 1 percent split (i.e., the coupler 350 has a 1 percent tap). In this case, the coupler 350 transmits 99 percent of the signal received from the pump fiber 320A to the pump fiber 320B and the remaining 1 percent of the signal to the terminated fiber 342, and transmits 99 percent of the reflected signal received from the pump fiber 320B to the pump fiber 320A and the remaining 1 percent of the signal to the reflection fiber 340.

In another implementation consistent with the present invention, the split amount is a 100 percent to 0 percent split. In this case, the coupler 350 transmits 100 percent of the signal received from the pump fiber 320A to the pump fiber 320B, and transmits 100 percent of the reflected signal received from the pump fiber 320B to the reflection fiber 340. One skilled in the art would recognize that other split amounts may also be possible.

When the laser 310 emits a signal, 100 percent of the signal enters the coupler 350 via pump fiber 320A. At this time, no signal enters the coupler 350 via the reflection fiber 340. If the coupler has a 1 percent tap, then the coupler 350 outputs 99 percent of the signal on pump fiber 320B and 1 percent of the signal on terminated fiber 342. Upon reflection at the connector 330 due to surface contamination, for example, 100 percent of the reflected signal enters the coupler 350 on the pump fiber 320B. No signal enters the coupler 350 via the terminated fiber 342 due to a conventional termination at the end thereof. The coupler 350 outputs 99 percent of the reflected signal back to the laser 310 on the pump fiber 320A and 1 percent of the reflected signal to the detector 360 on reflection fiber 340.

The detector 360 may include a photodiode that generates an electrical signal in response to the back-reflected signal on the reflection fiber 340. The electrical signal is then fed to monitoring circuit 370, which may include a conventional transimpedance amplifier. The electrical signal may be in the form of a current, which causes the transimpedance amplifier to output a voltage signal that shuts down the laser 310 when the detected amount of back reflectance is more than a predetermined amount. In other implementations consistent with the present invention, the monitoring circuit 370 includes a computer, microprocessor, or similar circuitry, that shuts down the laser 310 and flags the laser component for maintenance, using, for example, a notification signal, when the amount of back reflectance is more than the predetermined amount.

The monitoring circuit 370 may use a threshold to determine whether an imperfect connection exists at the connector or whether the component itself is faulty. A clean connection or nominal component will have minimal back reflection (e.g. some manufacturers of connectors and components specify a nominal backreflection value and this value can also be empirically determined). An imperfect connection due, for example, to the presence of surface contamination causes some back reflection beyond the "clean" value. A linear relationship often exists between the amount of power output by the laser 310 and the amount of back-reflected power from an imperfect ("unclean") connection.

The monitoring circuit 370 calculates a ratio of the amount of power output by the laser 310 to the amount of back-reflected power. If the ratio exceeds a predetermined threshold, then the monitoring circuit 370 shuts down the laser 310 and flags the laser component for maintenance. The monitoring circuit 370 detects the presence of the imperfect connection as the laser 310 gradually powers up, allowing the monitoring circuit 370 to detect the imperfect connection before the amount of power output by the laser 310 reaches an amount that can damage the connector.

Exemplary Operation (First Embodiment)

Figure 5:
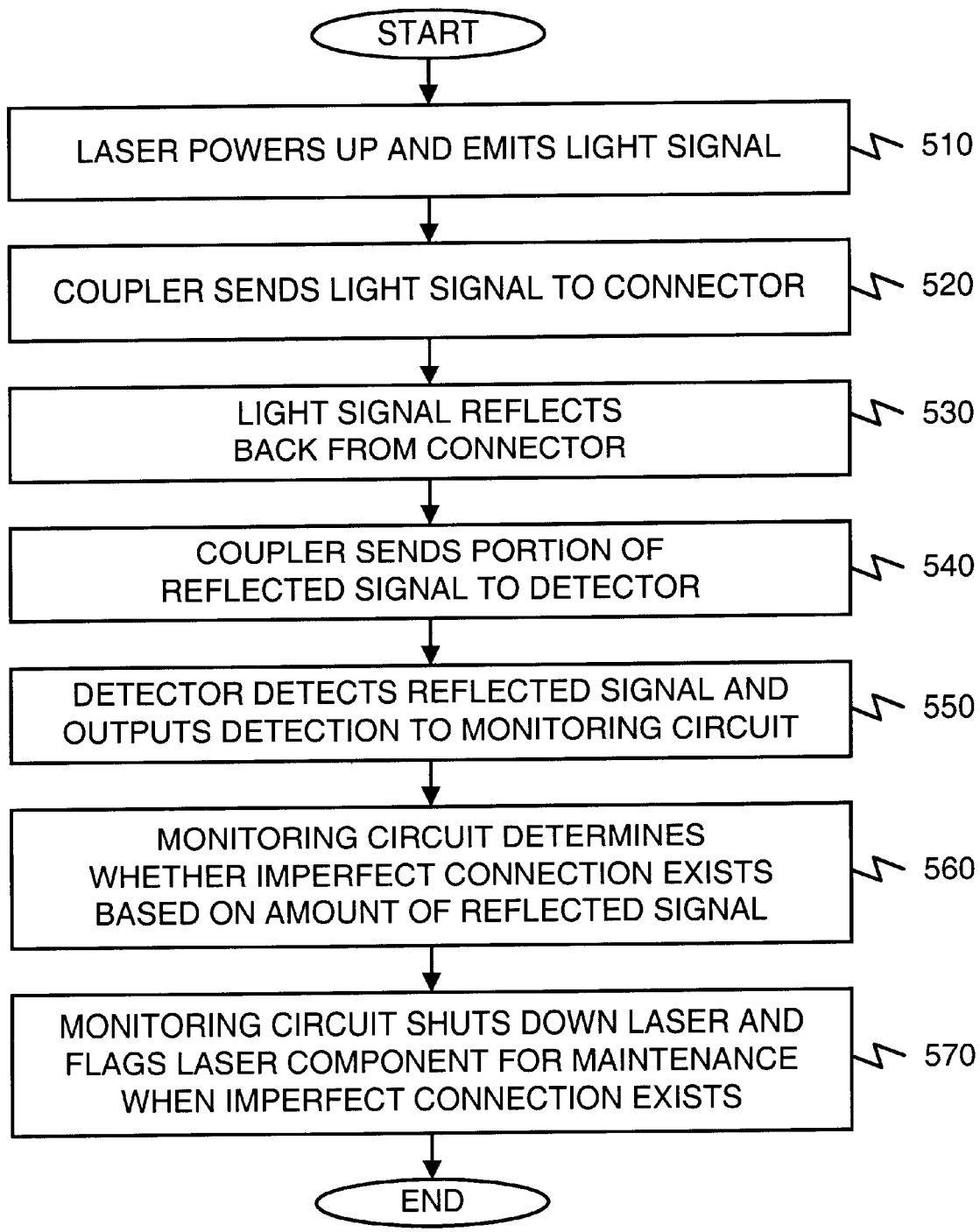
FIG. 5 is a flowchart of exemplary processing for detecting an imperfect connection upon startup in a manner consistent with the present invention.

FIG. 5 is a flowchart of exemplary processing for detecting an imperfect connection in a manner consistent with the present invention. Processing begins when the laser 310 (FIG. 3) begins to power up [step 510]. At this time, the laser 310 emits a light signal of low power. Over time, the laser 310 ramps up to emit a light signal of high power, such as 100–500 mW.

As the laser 310 ramps up, it transmits the light signal to the coupler 350 via the pump fiber 320A. Assume that the coupler 350 has a 1 percent tap. The coupler 350 transmits 99 percent of the received signal to the connector 330 over pump fiber 320B and the remaining 1 percent of the signal on the terminated fiber 342 [step 520]. If the connection provided by the connector 330 is imperfect through, for example, an imperfect mating of fibers or surface contamination on the fiber ends, a portion of the signal transmitted on the pump fiber 320B reflects back from the connector 330 [step 530]. The amount of signal reflection depends on the degree of imperfection in the connection.

The pump fiber 320B transmits the reflected signal to the coupler 350. Because the coupler 350 has a 1 percent tap, it transmits 99 percent of the reflected signal back to the laser 310 via the pump fiber 320A. The reflected signal has no effect on the laser 310. The coupler 350 transmits the remaining 1 percent of the reflected signal to the detector 360 via the reflection fiber 340 [step 540]. The detector 360 detects the reflected signal and outputs a signal indicative of the detection to the monitoring circuit 370 [step 550].

Using the signal from the detector 360, the monitoring circuit 370 determines whether an imperfect connection exists [step 560]. To make this determination, the monitoring circuit 370 tracks the power output of the laser 310 as it ramps up. The monitoring circuit 370 determines the ratio of the amount of power output from laser 310 to the amount of power in the reflected signal. If the ratio exceeds a predetermined threshold, the monitoring circuit 370 shuts down the laser 310 and may flag the laser component for maintenance [step 570]. In one implementation consistent with the present invention, the monitoring circuit 370 uses a table or equation relating laser 310 output power to threshold amount for its comparison.

Figure 6:
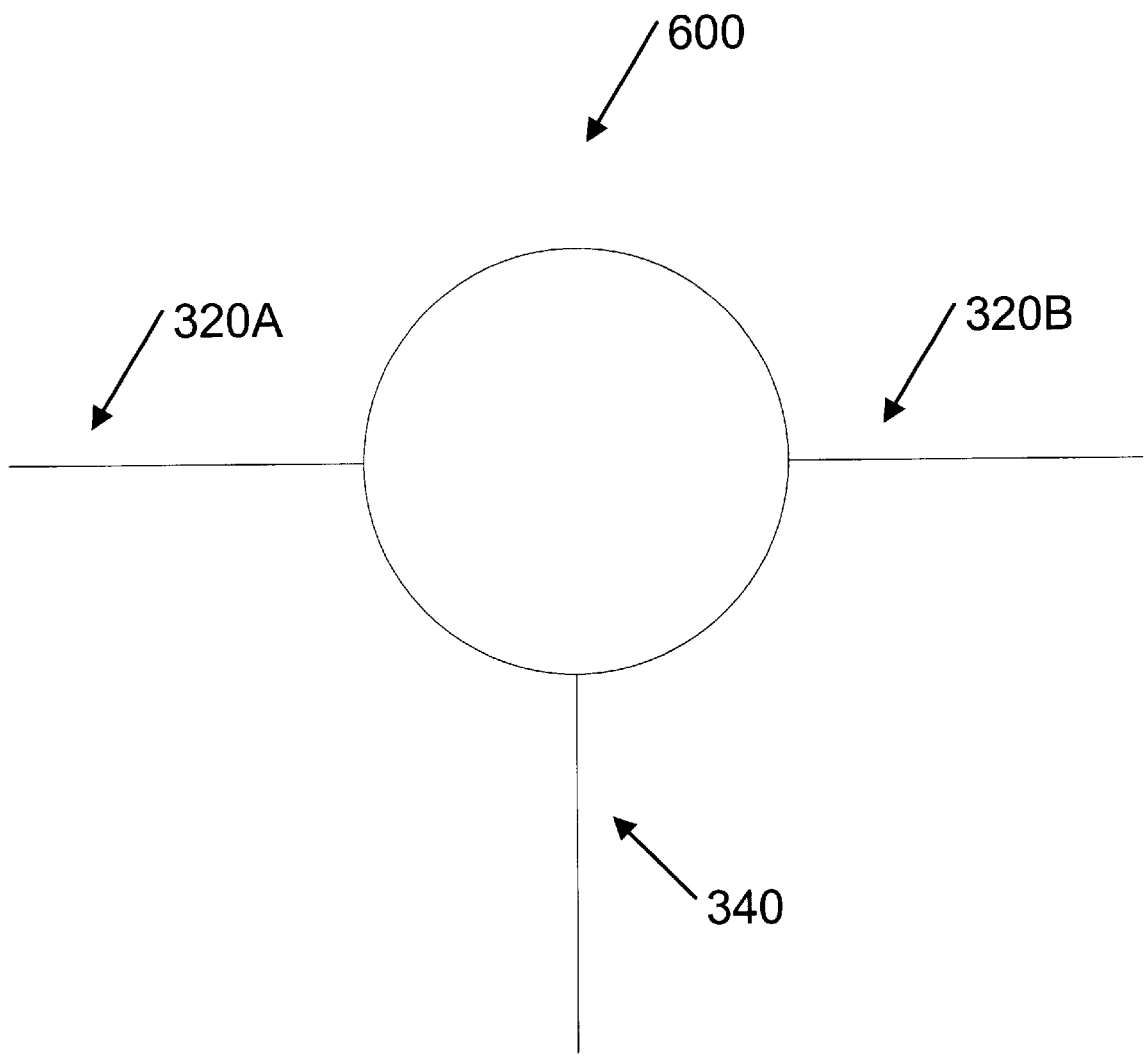
FIG. 6 illustrates a circulator for incorporation into an alternative embodiment of the present invention.

As seen in FIG. 6, a three-port circulator 600 can be used in place of coupler 350. In which case, light output from laser 310 is supplied to a first port of circulator 600 by fiber 320A, and circulated to a second output port coupled to fiber 320B for output to connector 330. Any light reflected from connector 320 reenters the second port, and is circulated to a third output port of circulator 600 to fiber 340 for output to photodetector 360.

Exemplary System (Second Embodiment)

Figure 7:
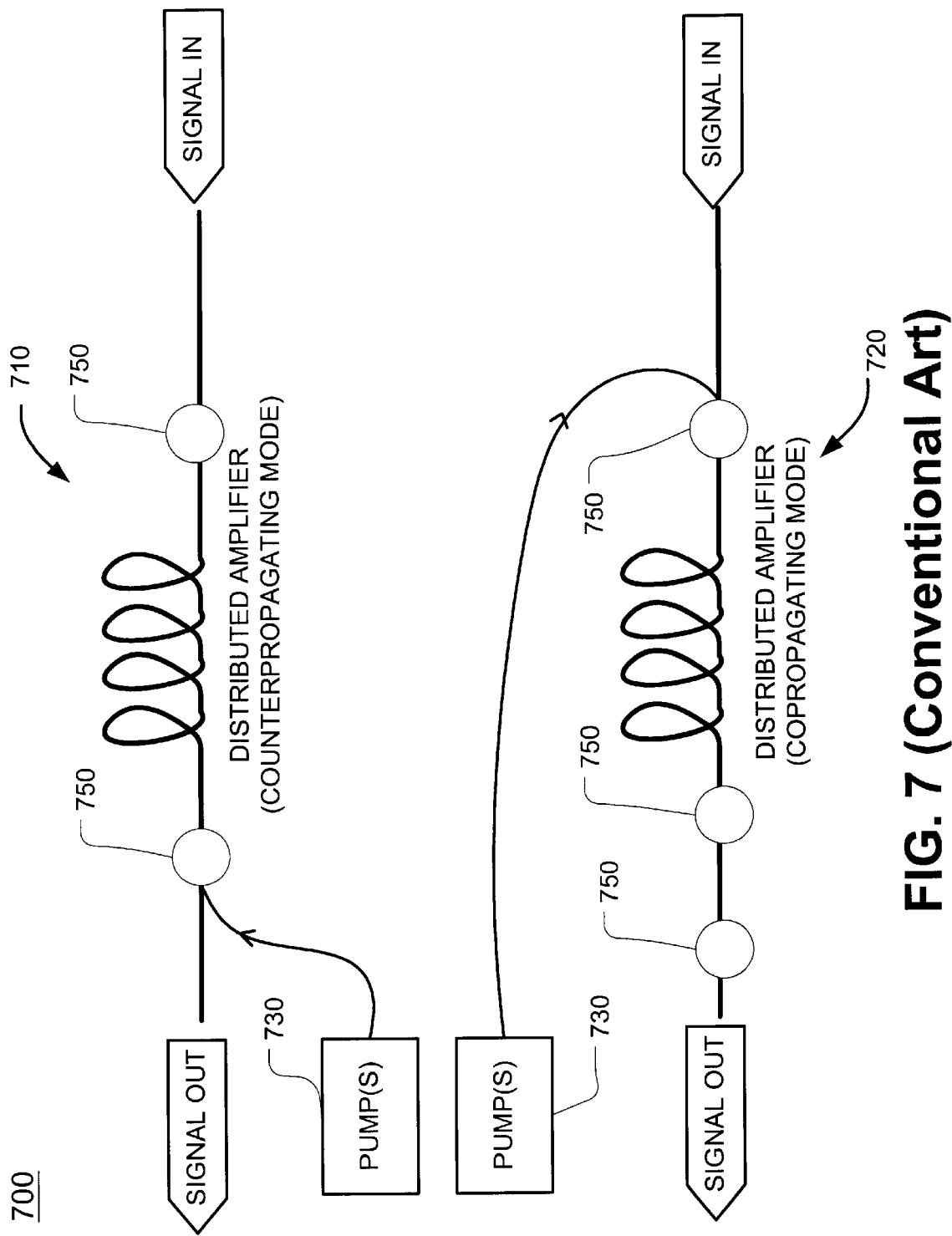
FIG. 7 is a diagram of a conventional distributed amplifier system in which systems and methods consistent with the present invention may be implemented.

FIG. 7 illustrates a conventional distributed amplifier system in which the present invention may be implemented.

The system shown in FIG. 7 includes separate pumps 730 for the westbound and eastbound signals that typically comprise a conventional fiber pair. Amplifier 710 operates in a counterpropagating mode in which the pumping light from pump 730 propagates in a direction counter or opposite to the signal light. In contrast, amplifier 720 operates in a copropagating mode in which the pumping light from pump 730 propagates in the same direction to the signal light. FIG. 7 thus illustrates that the invention is useful for both counter and copropagating amplifiers 710, 720.

FIG. 7 also shows various connectors and components 750 that may exist in the signal path. Connectors and components 750 are quite common and numerous in conventional optical systems. Connectors 750 may be used, for example, to connect the pump 730 to the optical fiber, to connect various other components such as add/drop multiplexers, MUX and DEMUX components, terminal network elements, and other network elements. A common symbol and reference numeral 750 also indicates various components or connectors of an optical system some of which are listed above. Reference numeral 750 also represent fiber splices that are conventionally used to splice sections of fiber together and to splice various components into the fiber line.

Figure 8:
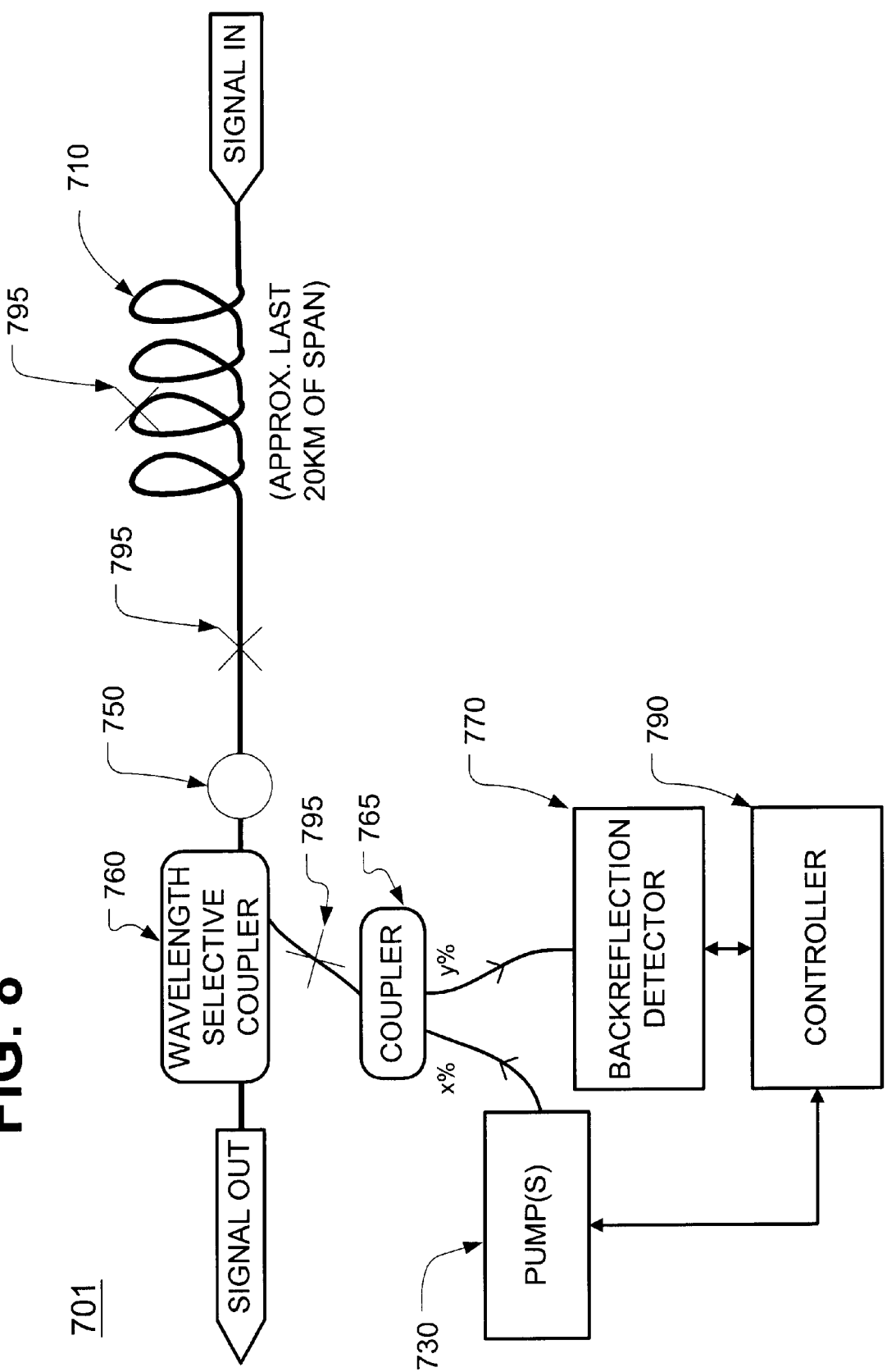
FIG. 8 is a diagram of a distributed amplifier system operating in a counterpropagating mode including components consistent with the present invention.

FIG. 8 shows a first exemplary construction 701 of the invention in which a optical pump source ("pump" for short) 730 fires pumping light into the fiber optic system. The configuration of FIG. 8 shows a counterpropagating distributed amplifier in which the pumping light from pump 730 propagates in a direction opposite to the signal light.

As further shown in FIG. 8, pump 730 may be connected to the optical fiber via coupler 765 and wavelength selective coupler 760. A backreflection detector 770 may also be connected to coupler 765 and to a controller 790. The pump 730 may be controlled by controller 790 via a control signal line as shown in FIG. 8.

Pump 730 may be constructed with a single pumping laser. More typically, however, pump 730 includes a plurality of lasers. The designation "pump(s)" is intended to indicate both alternatives.

Controller 790 may be constructed in a variety of fashions utilizing electronic components, optical components, computer hardware, firmware, software or a combination thereof. It is preferred that controller 790 be located close to the pump 730 to avoid a communications delay when the controller 790 shuts down or reduces the power of pump 730. In other words, it is desirable to reduce the delay between detection of a significant backreflection and the taking of precautionary measures such as shutting down pump 730. Reducing this delay increases safety by reducing the time in which pumping light may damage component(s) or harm human(s).

Pump 730 fires pumping light through coupler 765 and wavelength selective coupler 760 so that the pumping light travels in a direction counter to the signal light direction. Amplification occurs in along the fiber section 710 which may be an optically active fiber section or not. As the pumping light transfers energy to the signal light for amplification of the signal light, the pumping light energy level decreases. This is illustrated in FIG. 8 which notes that fiber section 710 in which significant amplification occurs is about 20 km in length. This length will vary depending upon the type of amplification and pumping light power. The length of 20 km is typical of a Raman amplifier. The point is that significant backreflections may be detected only while the pumping light power is of a sufficient level. Of course, when the pumping light signal strength is too weak in a distant part of fiber 710, then the danger posed by the pumping light to equipment and personnel is also reduced.

Backreflection detector 770 may be constructed with a variety of photodetector elements such as the photodetector 360 described in the first embodiment.

Wavelength selective coupler 760 may be constructed with various devices to permit the signal light and pumping light to pass transparently therethrough. The pump 730 emits light at a wavelength different than the signal light. The wavelength selective coupler 760 is frequency or wavelength selective in that it will route the pumping light back reflection to backreflection detector 770 via coupler 765.

Wavelength selective coupler 760 may be a wavelength dimension multiplexer using a Bragg filter or Fabry-Perot interferometer. Wavelength selective coupler 760 may also be made from dielectric coatings, thin-film filter, or arrayed waveguides, which reflects the pump 730 wavelengths but lets the signal light pass through, or vice versa.

Coupler 765 splits the backreflection light and sends x% of the backreflection light to pump 730 and y% to backreflection detector 770, where y% is generally much smaller than x%. Like coupler 350 described above, the relative split percentages can be adjusted as is known in the art. Coupler 765 also transmits the pumping light from pump 730 to the wavelength selective coupler 760 for injection into the main fiber.

Coupler 765 may be constructed is a variety of fashions such as with a twisted pair of fibers fused together so that the light 'mixes' in the middle and splits out the ends. In general, coupler 765 may be characterized as a broadband bidirectional multiport passive optical device which combines then splits the combined light by a predescribed ratio.

FIG. 8 also shows a few of the locations in which detectable fiber damage can occur. These potential fiber damage locations 795 are designated with an "X" and may include any point downstream of the pump 730 and backreflection detector 770. For example, a first location 795 is shown just downstream of coupler 765.

Figure 9:
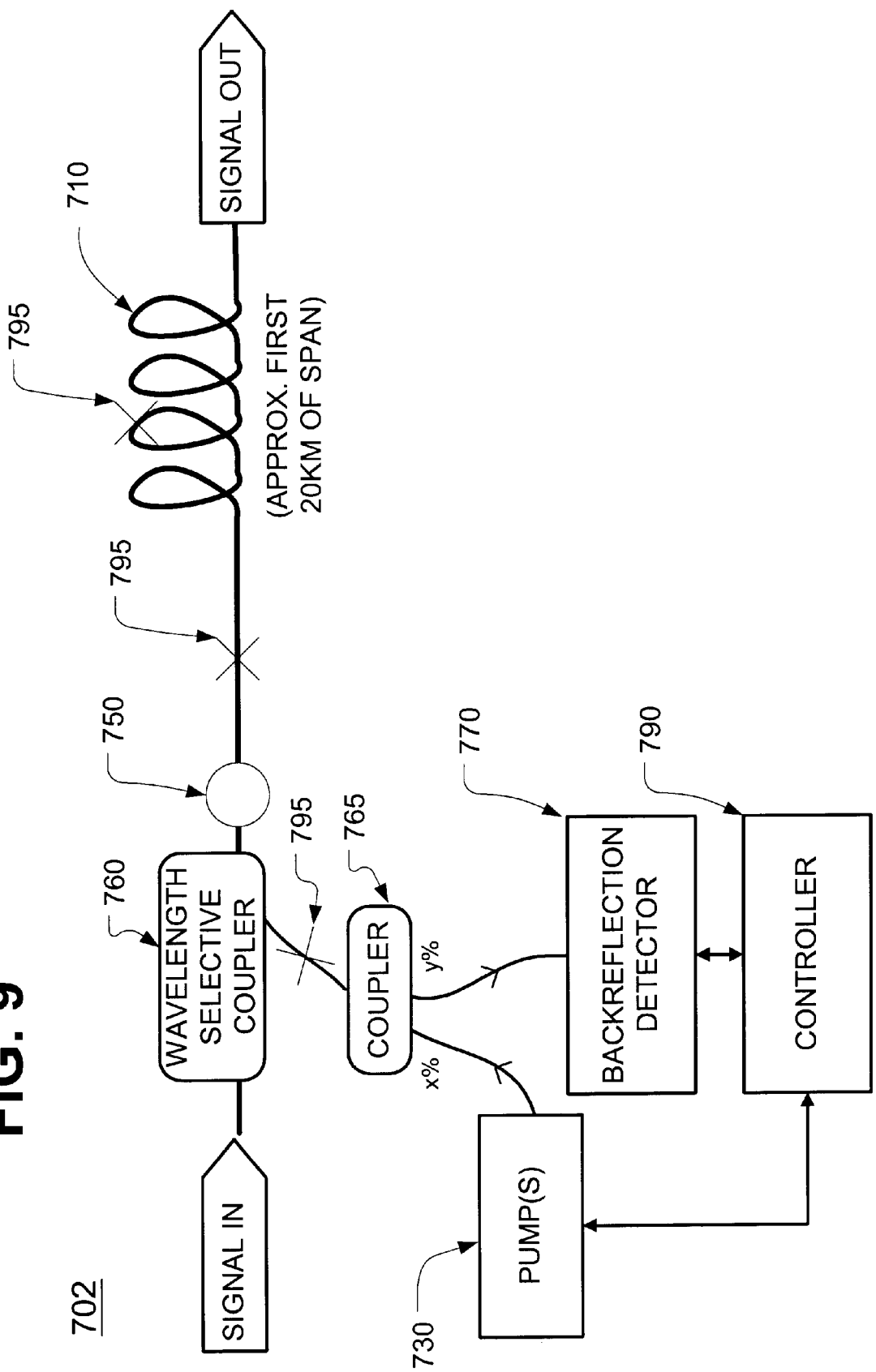
FIG. 9 is a diagram of a distributed amplifier system operating in a copropagating mode including components consistent with the present invention.

FIG. 9 is quite similar to FIG. 8 with the main difference being the direction of pumping light propagation. FIG. 8 shows a system 701 using counterpropagating pumping light while FIG. 9 shows a system 702 using copropagating pumping light.

Figure 10:
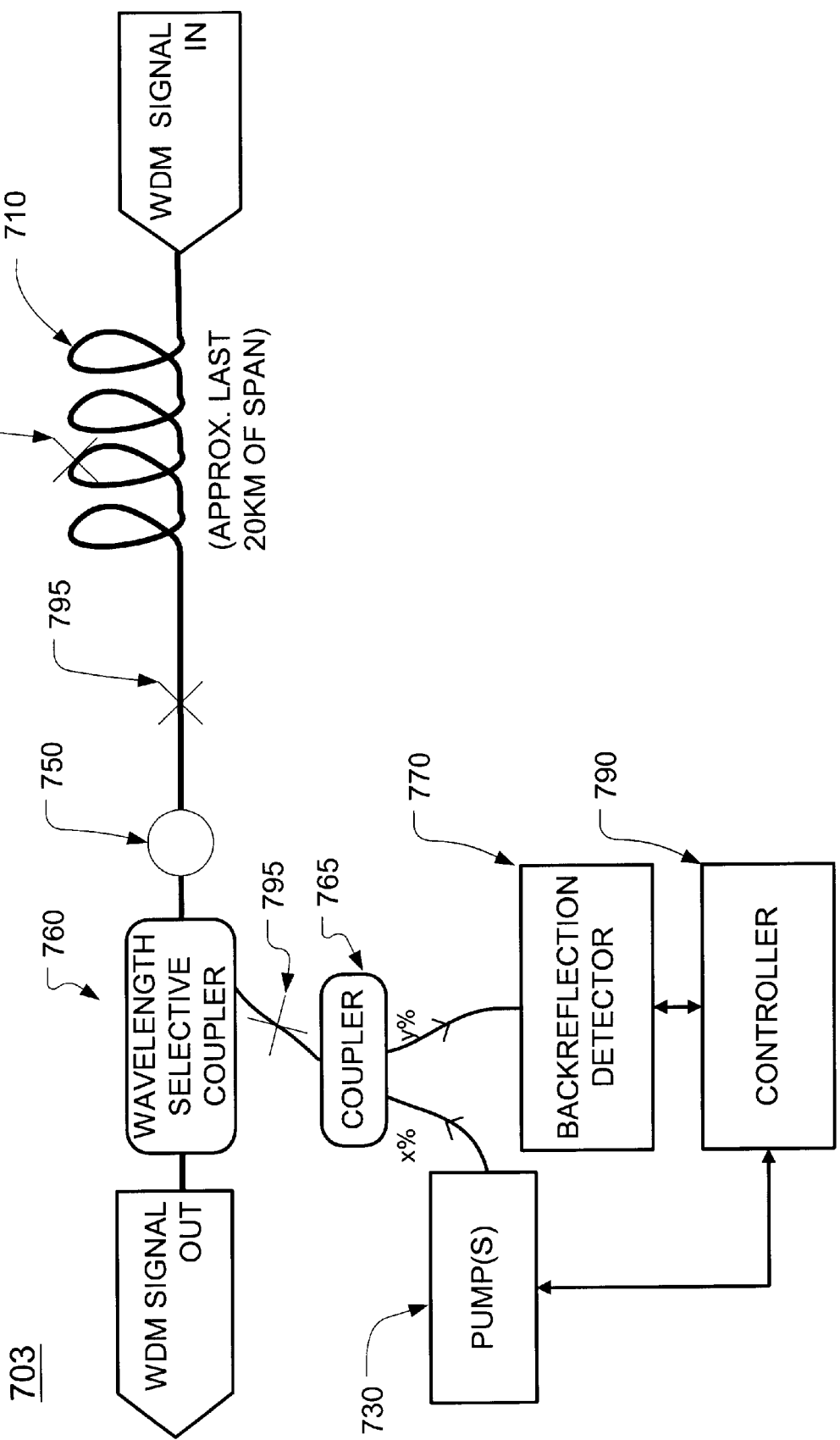
FIG. 10 is a diagram of a distributed amplifier wavelength division multiplexed system operating in a counterpropagating mode including components consistent with the present invention.

FIG. 10 is WDM (wavelength division multiplexed) system 702 using counterpropagating pumping light. It is to be understood that a WDM system using copropagating pumping light is also within the scope of the claimed invention.

WDM systems are conventional and well-known so a detailed description thereof is omitted here. It is important to note that the invention may be applied to WDM systems in much the same way as single wavelength systems.

Figure 11:
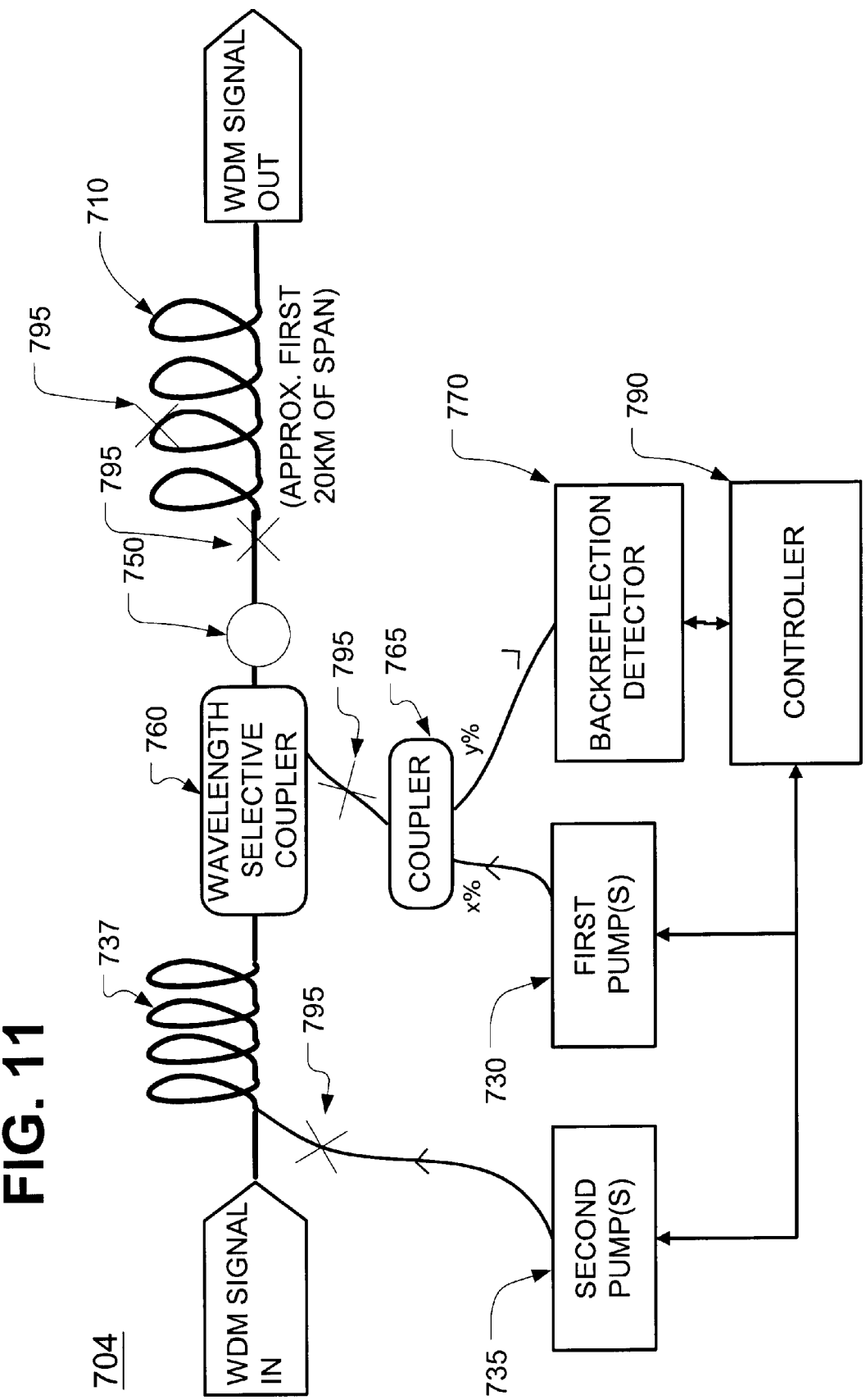
FIG. 11 is a diagram of a distributed amplifier wavelength division multiplexed system operating in a copropagating mode including discrete amplifier components and components consistent with the present invention.

FIG. 11 illustrates an exemplary architecture that permits control over different types of pumps including distributed amplifier pump 730 and discrete amplifier pump 735. An example of a distributed amplifier pump 730 is a Raman pump that is configured to emit a pumping light at a wavelength(s) and a power sufficient to induce Raman amplification. An example of a discrete amplifier pump 735 is an EDFA (erbium doped fiber amplifier) pump that pumps the optically active fiber section 737 in order to amplify the signal light. As mentioned above pump 730 may be constructed with only one or a plurality of pumping lasers. The same is true for pump 735.

Both pumps 730,735 are controlled by controller 790 as indicated by the control lines connecting these elements. Further details of the control methodology are described in relation to FIG. 13 below.

Although FIG. 11 specifically illustrates a WDM fiber optic system 704 in which the distributed amplification occurs in a copropagating mode, it is to be understood that multiple pump control according to the invention is not limited to this particular configuration and includes single wavelength optical systems, counterpropagating modes and a plurality of pumps 730 and 735.

Exemplary Operation (Second Embodiment)

In general, the second embodiment operates as follows. The backreflection detector 770 receives any backreflections of the pumping light signal. Such backreflections of the pumping light signal may be generated by such things as a degraded or failed (imperfect) connector/component 750 or fiber 795. As described above a connector/component 750 may be degraded by a variety of factors such as contamination. Fibers may be damaged in a variety of ways such as by cutting. In addition, disconnecting a connector or fiber from a component in the system will cause backreflections of the pumping light signal and create a condition potentially hazardous to humans or components.

The invention detects these pumping light backreflections by utilizing the backreflection detector 770. The signal from backreflection detector 770 is fed to controller 790 which then utilizes this signal to determine whether the backreflection is significant enough to warrant precautionary measure(s). This determination by controller 790 may be done based on a variety of quantifications of the backreflection light. For example, the backreflection detector 770 may output a signal consistent with the energy of the backreflection. This energy value may then be compared by controller 790 against a threshold value.

Alternatively, the controller 770 may use another quantification such as a power measurement that may be compared against a threshold directly or which may first be normalized by taking the ratio of backreflection power to pump 730 output power. In any of these alternatives, the actual threshold value utilized will vary according to various system parameters such as pump 730 power, attenuation values in the system, etc.

As a further alternative, the controller 790 may utilize a plurality of thresholds such as a first and a second threshold to distinguish between varying levels of danger posed by the backreflection and to help decide between various precautionary measures that may be taken. For example, the first threshold may be utilized by controller 790 to distinguish between nominal backreflections that are expected in a nominally operating system and backreflections indicating a degraded condition. A second threshold would then distinguish between backreflections indicating a degraded condition and those indicting a failed condition. The label "degraded" and "failed" are not limitative of the invention and are merely being used to indicate the varying levels of discrimination that may be built into controller 790 to discriminate between varying levels of backreflections. These different levels of discrimination may also be used by controller 790 to select the appropriate precautionary measure(s).

If only one threshold is utilized by controller 790, then the controller 790 may decide to take the precautionary measure of shutting down pump 730. This form of precautionary measure will prevent the pumping light from causing damage. As mentioned above, power densities of pumps 730, particularly distributed amplifier pumps such as Raman pumps, are quite high and could damage not only connectors and components but could also cause physical harm to humans unlucky enough to be in the path of the escaping pump light. Shutting down the pump 730 would prevent such damage or physical harm.

Another precautionary measure that may be taken by the controller 790 is reducing the output power of the pump 730. This may be done by reducing the current applied to the laser(s) within the pump 730. The output power may be reduced to a level that is considered "safe" for the components involved in the system and/or the humans likely to come in contact with the pump light. An advantage of reducing pump 730 output power is that some amplification could still occur so that a total signal failure due to insufficient amplification may be prevented.

Yet another precautionary measure is the setting of a maintenance flag. Upon detecting a significant backreflection (surpassing one or more of the thresholds), controller 790 may set a maintenance flag or otherwise notify appropriate maintenance personnel of the problem. This precautionary measure may be taken in place of or in addition to the other precautionary measures mentioned above. The term "maintenance flag" is intended to encompass any notification to a system (e.g. central control station) or to maintenance personnel notifying these systems or personnel of the backreflection problem.

Figure 12:
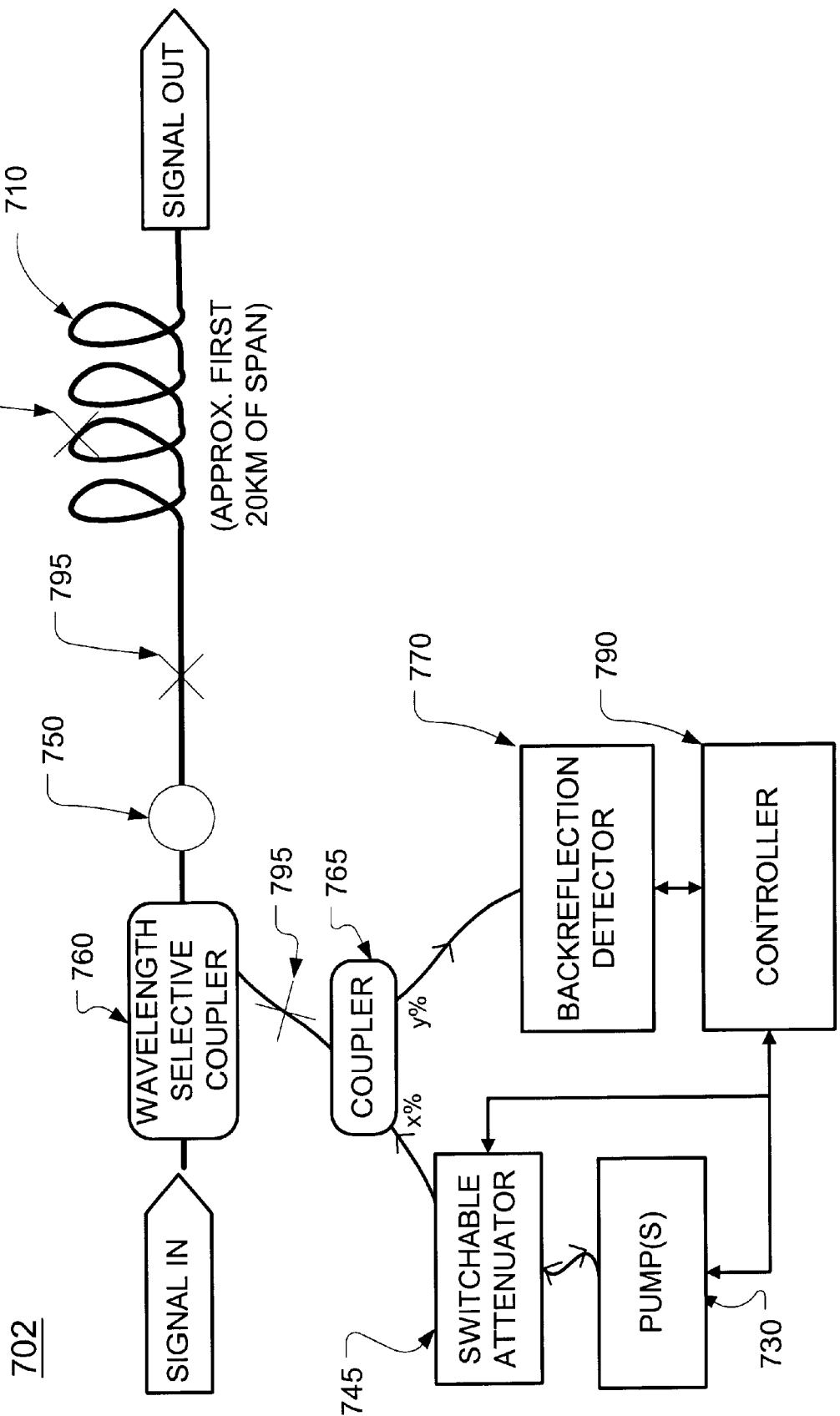
FIG. 12 is a diagram of a distributed amplifier system operating in a copropagating mode including alternative components consistent with the present invention for reducing output power of the pump.

Still another precautionary measure involves alternative equipment such as the switchable attenuator 745 shown in FIG. 12. This switchable attenuator 745 is controlled by controller 790 and is inserted in the fiber path between pump 730 and coupler 765. Switchable attenuator may be constructed with a variety of components such as a simple shutter mechanism, a transmissive liquid crystal that can be switched to a translucent or opaque state, or microelectromechanical systems (MEMS). By using switchable attenuator 745, controller 790 may take yet another precautionary measure to reduce or eliminate output power from pump 730. It is to be understood that the switchable attenuator shown in FIG. 12 may be utilized with any of the other constructions or embodiments of the inventions.

Figure 13:
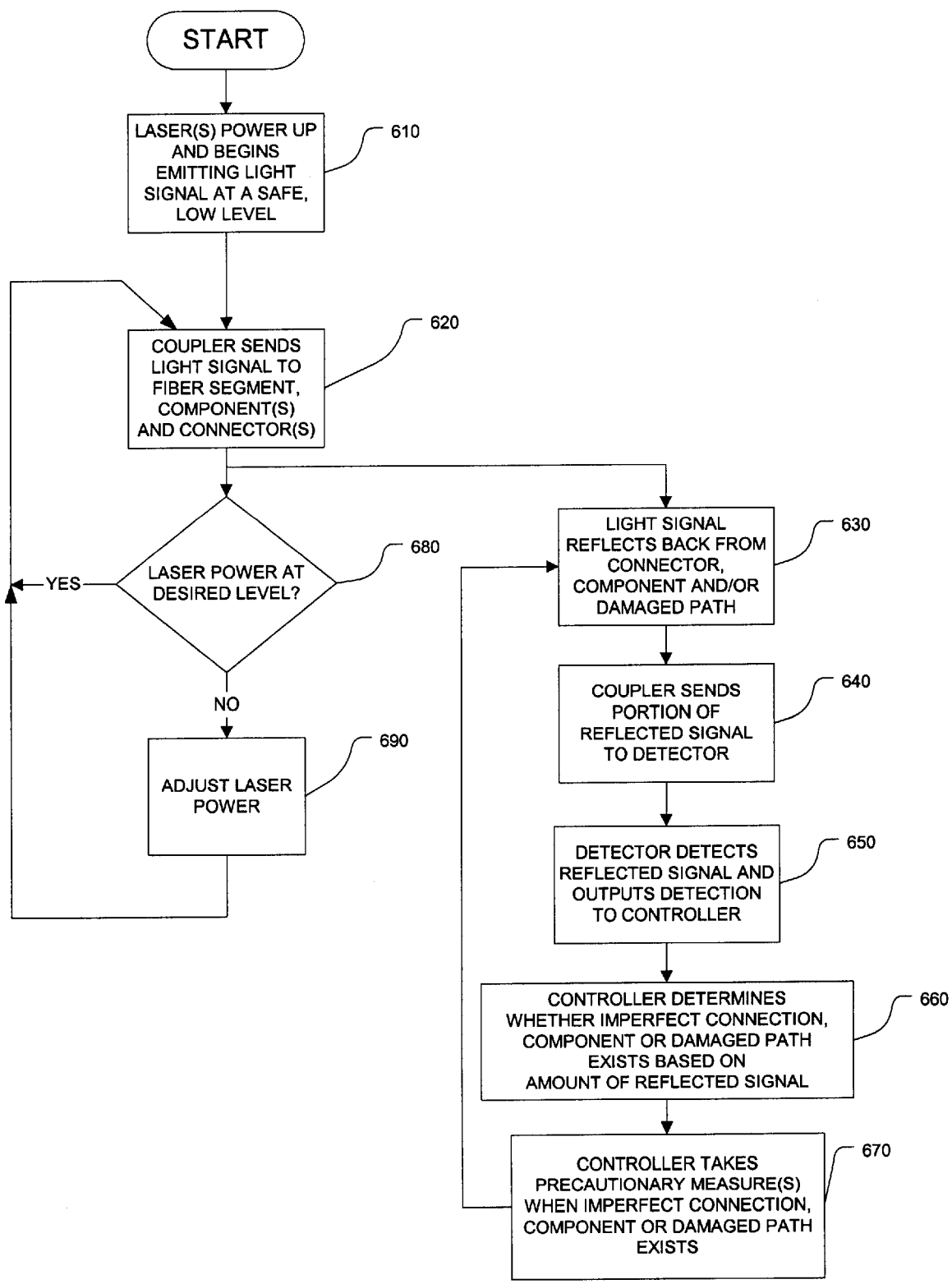
FIG. 13 is a flowchart of exemplary processing for detecting optical fiber damage or imperfect connections consistent with the present invention.

FIG. 13 is an exemplary flowchart formalizing the operation of the invention. As shown therein, the laser(s) in the pump 730 are powered up and begin emitting pumping light at a relatively low or safe level (step 610). The couplers 760,765 send this pumping light to the fiber segment and any connector(s)/component(s) 750 that may be present (step 620). This begins a power-increasing loop in which the laser power is adjusted (step 690) and tested (step 680) to determine if the desired power level has been achieved. The pump 730 ramps up power in this fashion until the desired level has been achieved.

In parallel with the above process and beginning with the coupler 765 sending the pump light to the fiber, the pump light signal may be reflected from a connector/component 750 and/or damaged fiber 795 (step 630). The couplers 760,765 send a portion of this backreflected pump light to backreflection detector 770 (step 640) which detected the backreflected signal and outputs this detection to controller 790 (step 650).

The controller 790 then determines whether an imperfect connection/component 750 or damaged path 795 exists based on the amount of the detected backreflection (step 660). This determination may be made by using one or more thresholds as described above.

Controller 790 may then take one or more precautionary measures when an imperfect connection or damaged path 795 exists (step 670). The various alternative precautionary measures are also described above in detail.

This process continues as indicated by the loop connecting steps 670 and 630. In other words, the inventive methodology may operate during power up and operational modes so that precautionary measures may be taken initially during power or when the system is operational.

Conclusion

Systems and methods consistent with the present invention detect imperfect connections in laser components, as the laser powers up and then as the laser maintains a steady state, to prevent damage caused by the imperfect connections or faults to the laser components.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. An apparatus for controlling an amplified optical system, comprising
    an optical pump source operatively connected to a fiber optic system having an optical fiber,
    said optical pump source operable at a pumping wavelength selected to provide gain to a signal travelling in a segment of the optical fiber, wherein the pumping wavelength is different than a signal wavelength;
    wherein the optical fiber transmits a pumping light signal from said optical pump source and a reflected pumping light signal when the optical fiber is damaged or when a component in the optical system is degraded or failed;
    a back reflection detector operatively connected to the optical fiber, said back reflection detector configured to detect an amount of the reflected pumping light signal; and
    a controller operatively connected to said optical pump source and to said back reflection detector;
    said controller taking at least one precautionary measure when the detected amount of the reflected pumping light signal detected by said back reflection detector exceeds a threshold value.

2. The apparatus for controlling an amplified optical system according to claim 1,
    wherein the at least one precautionary measure includes reducing output power of said optical pump source,
    said controller reducing the optical pump source output power of said optical pump source when the detected amount of the reflected pumping light signal detected by said back reflection detector exceeds the threshold value.

3. The apparatus for controlling an amplified optical system according to claim 1,
    wherein the at least one precautionary measure includes shutting down said optical pump source,
    said controller shutting down said optical pump source when the detected amount of the reflected pumping light signal detected by said back reflection detector exceeds the threshold value.

4. The apparatus for controlling an amplified optical system according to claim 1, wherein
   the threshold value includes at least a first threshold value and a second threshold value,
   wherein the at least one precautionary measure includes shutting down or reducing output power of said optical pump source,
   said controller reducing the optical pump source output power of said optical pump source when the detected amount of the reflected pumping light signal detected by said back reflection detector exceeds the first threshold value; and
   said controller shutting down said optical pump source when the detected amount of the reflected pumping light signal detected by said back reflection detector exceeds the second threshold value.

5. The apparatus for controlling an amplified optical system according to claim 1,
   wherein the at least one precautionary measure includes setting a maintenance flag,
   said controller setting the maintenance flag when the detected amount of the reflected pumping light signal detected by said back reflection detector exceeds the threshold value.

6. The apparatus for controlling an amplified optical system according to claim 1, further comprising:
   at least one second optical pump source operatively connected to the fiber optic system,
   wherein the at least one precautionary measure includes reducing output power of said first and second optical pump sources,
   said controller reducing optical pump source output power of said first and second optical pump sources when the detected amount of the reflected pumping light signal detected by said back reflection detector exceeds the threshold value.

7. The apparatus for controlling an amplified optical system according to claim 1, further comprising:
   at least one second optical pump source operatively connected to the fiber optic system,
   wherein the at least one precautionary measure includes shutting down said first and second optical pump sources,
   said controller shutting down said first and second optical pump sources when the detected amount of the reflected pumping light signal detected by said back reflection detector exceeds the threshold value.

8. The apparatus for controlling an amplified optical system according to claim 1,
   wherein the at least one precautionary measure includes controlling output power of said optical pump source,
   the apparatus further comprising:
      a switchable attenuator operatively connected to said controller and operatively connected between said optical pump source and the fiber optic system;
      said controller reducing the optical pump source output power of said optical pump source by controlling said switchable attenuator to attenuate at least a portion of the pumping light signal when the detected amount of the reflected pumping light signal detected by said back reflection detector exceeds the threshold value.

9. The apparatus for controlling an amplified optical system according to claim 1,
   said second optical pump source pumping a segment of the optical fiber doped with an optically active material.

10. The apparatus for controlling an amplified optical system according to claim 1,
    said optical pump source emitting the pumping light signal with increasing power during power up.

11. The apparatus for controlling an amplified optical system according to claim 1,
    said backreflection detector and said controller being operable during power up and operational modes.

12. The apparatus for controlling an amplified optical system according to claim 1,
    said controller determining a ratio of power of the pumping light signal emitted by said optical pump source to power of the reflected pumping light signal,
    said controller comparing the ratio to the threshold to determine whether to take the at least one precautionary measure.

13. The apparatus for controlling an amplified optical system according to claim 1,
    said optical pump source operatively connected to the fiber optic system to provide counterpropagating or copropagating gain to a signal travelling in a segment of the optical fiber,
    said optical pump source operable at a pumping wavelength selected to provide Raman or Brillouin gain to a signal travelling in a segment of the optical fiber.

14. The apparatus for controlling an amplified optical system according to claim 1,
    said optical pump source including a plurality of pumping lasers.

15. The apparatus for controlling an amplified optical system according to claim 1, further comprising:
    a wavelength selective coupler operatively connected to a first and a second section of the optical fiber, said wavelength selective coupler transmitting optical signals in a first wavelength range between the first and second sections of the optical fiber,
    said wavelength selective coupler transmitting optical signals in a second wavelength range from the first section of the optical fiber to an output of said wavelength selective coupler, wherein the second wavelength range includes the pumping wavelength of the reflected pumping light signal,
    a coupler operatively connected to said optical pump source, said backreflection detector, and the output of said wavelength selective coupler,
    said coupler receiving the reflected light signal from said wavelength selective coupler and transmitting a first portion of the reflected light signal to said optical pump source and a second portion of the reflected light signal to said backreflection detector,
    said coupler and said wavelength selective coupler transmitting the pumping light signal from said optical pump source to the first section of optical fiber.

16. A method for controlling an amplified optical system including an optical fiber and an optical pump source providing gain to a signal travelling in a segment of the optical fiber, the method comprising:
    detecting a reflected pumping light signal from the optical pump source that is reflected when the optical fiber is damaged or when a component in the optical system is degraded or failed;
    taking at least one precautionary measure when a detected amount of the reflected pumping light signal detected by said detecting step exceeds a threshold value, wherein the at least one precautionary measure includes reducing output power of the optical pump source; and reducing the optical pump source output power of the optical pump source when the detected amount of the reflected pumping light signal detected by said detection step exceeds a threshold value.

17. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value;

wherein the at least one precautionary measure includes shutting down the optical pump source; and shutting down the optical pump source when the detected amount of the reflected pumping light signal detected by said detecting step exceeds the threshold value.

18. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value;

wherein the threshold value includes a first threshold value and a second threshold value, wherein the at least one precautionary measure includes shutting down or reducing output power of the optical pump source, reducing the optical pump source output power of the optical pump source when the detected amount of the reflected pumping light signal detected by said detecting step exceeds the first threshold value; and shutting down the optical pump source when the detected amount of the reflected pumping light signal detected by said detecting step exceeds the second threshold value.

19. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value;

wherein the at least one precautionary measure includes setting a maintenance flag; and setting the maintenance flag when the detected amount of the reflected pumping light signal detected by said detecting step exceeds the threshold value.

20. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value;

wherein the optical system includes a second optical pump source, wherein the at least one precautionary measure includes reducing output power of the first and second optical pump sources; and reducing optical pump source output power of the first and second optical pump sources when the detected amount of the reflected pumping light signal detected by said detecting step exceeds the threshold value.

21. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value;

wherein the optical system further includes a second optical pump source, wherein the at least one precautionary measure includes shutting down the first and second optical pump sources; and shutting down the first and second optical pump sources when the detected amount of the reflected pumping light signal detected by said detecting step exceeds the threshold value.

22. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value; and emitting the pumping light signal with increasing power during power up of the optical pump source.

23. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value; and continuously performing said detecting and taking steps during power up and operational modes of the optical pump source.

24. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value; and determining a ratio of power of the pumping light signal emitted by the optical pump source to power of the reflected pumping light signal, said taking step comparing the ratio to the threshold.

25. A method for controlling an amplified optical system including an optical fiber and an optical pump source providing gain to a signal travelling in a segment of the optical fiber, the method comprising:

detecting a reflected pumping light signal from the optical pump source that is reflected when the optical fiber is damaged or when a component in the optical system is degraded or failed;

taking at least one precautionary measure when a detected amount of the reflected pumping light signal detected by said detecting step exceeds a threshold value, wherein the optical pump source provides Raman or Brillouin gain to a signal travelling in a segment of the optical fiber.

26. A method for detecting signal path integrity in a fiber optic system including an optical fiber and an optical pump source, the method comprising:

providing gain to a signal travelling in a segment of the optical fiber with a pumping light signal from the optical pump source;

detecting a reflected pumping light signal, wherein the reflected pumping light signal is a reflection of the pumping light signal from the optical pump source that is reflected when the optical fiber is damaged or when a component in the optical system is degraded or failed; and determining that the signal path integrity is compromised when a detected amount of the reflected pumping light signal detected by said detecting step exceeds a threshold value.

27. The method for detecting signal path integrity in a fiber optic system according to claim 26, wherein the threshold value includes a first threshold value and a second threshold value, said determining step determining that the signal path integrity is in a degraded state when the detected amount of the reflected pumping light signal detected by said detecting step exceeds the first threshold value; and said determining step determining that the signal path integrity is in a failed state when the detected amount of the reflected pumping light signal detected by said detecting step exceeds the second threshold value.

28. The method for detecting signal path integrity in a fiber optic system according to claim 26, wherein the gain is Raman or Brillouin gain.

* * * * *